United States Patent

Mukainakano et al.

[11] Patent Number: 6,118,253
[45] Date of Patent: Sep. 12, 2000

[54] CHARGING AND DISCHARGING CONTROL CIRCUIT AND CHARGING TYPE POWER SUPPLY DEVICE

[75] Inventors: Hiroshi Mukainakano; Koichi Yamazaki, both of Chiba, Japan

[73] Assignee: Seiko Instruments Inc., Japan

[21] Appl. No.: 09/304,414

[22] Filed: May 3, 1999

[30] Foreign Application Priority Data

May 6, 1998 [JP] Japan .................................. 10-123607

[51] Int. Cl.[7] ..................................................... H02J 7/00
[52] U.S. Cl. .......................................... 320/134; 320/136
[58] Field of Search ..................................... 320/127, 128, 320/134, 135, 136; 429/61; 340/635, 636

[56] References Cited

U.S. PATENT DOCUMENTS

| 5,547,775 | 8/1996 | Eguchi et al. ......................... 429/61 X |
| 5,705,913 | 1/1998 | Takeuchi et al. . |
| 5,804,944 | 9/1998 | Alberkrack et al. ..................... 320/163 |
| 5,808,446 | 9/1998 | Eguchi ..................................... 320/134 |
| 5,896,025 | 4/1999 | Yamaguchi et al. .................... 320/134 |
| 5,959,436 | 9/1999 | Takashina et al. ...................... 320/134 |
| 5,959,437 | 9/1999 | Hamaguchi .............................. 320/134 |
| 5,990,663 | 11/1999 | Mukainakano .......................... 320/134 |

*Primary Examiner*—Edward H. Tso
*Attorney, Agent, or Firm*—Adams & Wilks

[57] ABSTRACT

A charge/discharge control circuit has a voltage detecting circuit for detecting at least one of an over-charge state, an over-discharge state and an over-current state of a battery, a control circuit for receiving an output signal of the detecting circuit and outputting a signal for controlling the charging and discharging of the battery, and an activating circuit connected to the control circuit for selectively activating the control circuit according to an output signal of the detecting circuit so as to limit the power consumption of the charge/discharge control circuit by operating the control circuit only when one of an over-charge state, an over-discharge state and an over-current state of the electric power source is detected.

34 Claims, 7 Drawing Sheets

CHARGING AND DISCHARGING CONTROL CIRCUIT AND CHARGING TYPE POWER SUPPLY DEVICE

BACKGROUND OF THE INVENTION

The present invention relates to a charging and discharging control circuit for controlling the charging and discharging of a secondary battery by turning on/off a switch circuit and to a charging type power supply device of a secondary battery having the charging and discharging control circuit incorporated therein.

Figure 2:
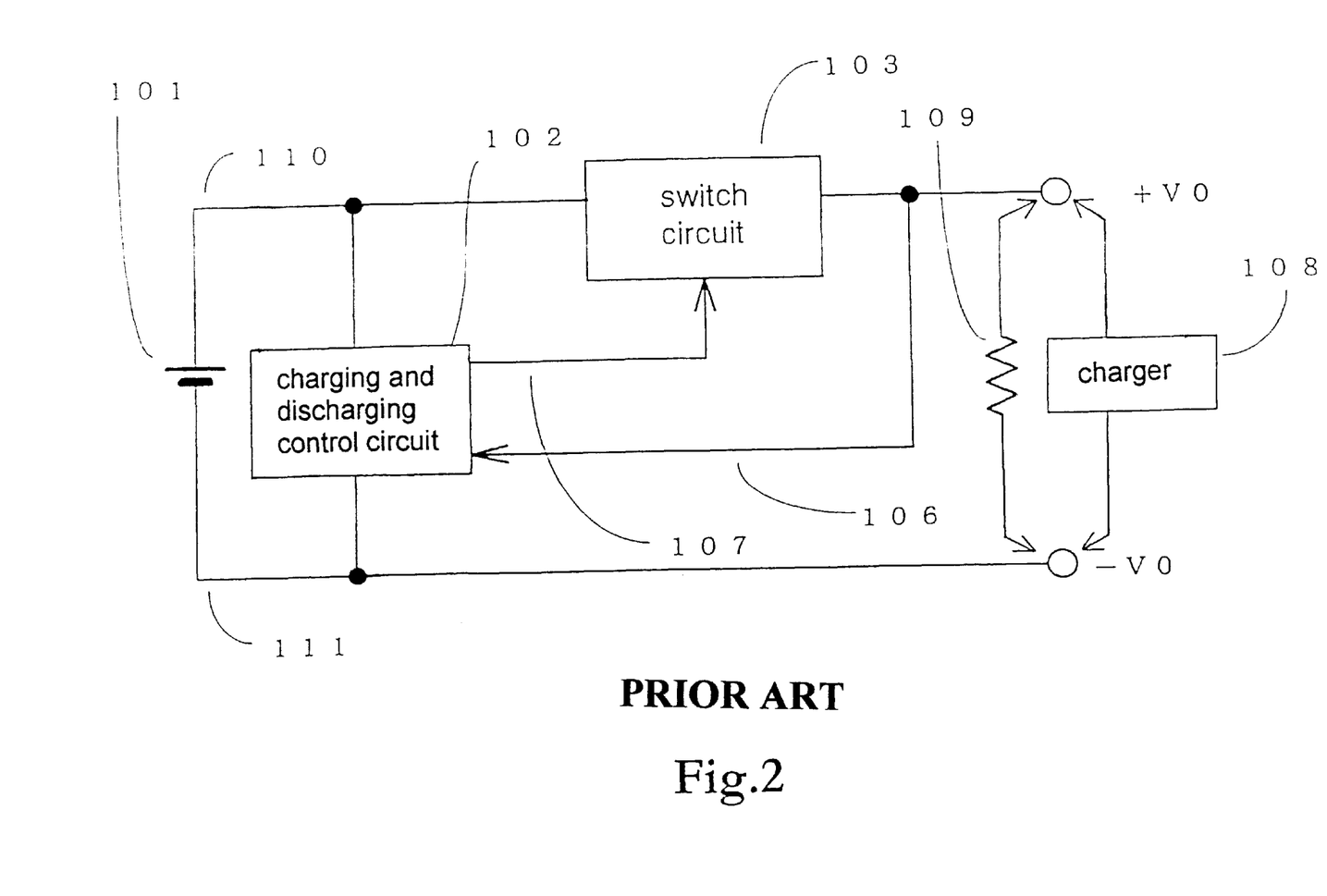
FIG. 2 is an explanatory view illustrating a block diagram of a conventional charging type power supply device.

As a conventional charging type power supply device comprising a secondary battery, a power supply device shown in a circuit block diagram of FIG. 2 is known. Such a structure is disclosed in, for example, Japanese unexamined patent application publication No. H4-75430 (1992) entitled "CHARGING TYPE POWER SUPPLY DEVICE." More specifically, a secondary battery 101 is connected to an external terminal −V0 or +V0 through a switch circuit 103. Further, a charging and discharging control circuit 102 is connected in parallel to the secondary battery 101. The charging and discharging control circuit 102 has a function of detecting the voltage of the secondary battery 101. In case the secondary battery 101 is either in an over-charge state (a state where the battery voltage is above a predetermined value—hereinafter referred to as an over-charge protection state) or in an over-discharge state (a state where the battery voltage is below a predetermined value—hereinafter referred to as an over-discharge protection state), a signal is output by the charging and discharging control circuit 102 to turn off the switch circuit 103. Further, it is possible to restrict the current through the switch circuit 103 by controlling the switch circuit 103 so that, when the external terminal +V0 reaches a certain voltage, the switch circuit 103 turned off to stop the discharging. In other words, the discharging can be stopped when the current is excessive (over-current control). This state is hereinafter referred to as an over-current protection state. It is the role of the charging and discharging control circuit 102 to protect the battery against these states.

Figure 3:
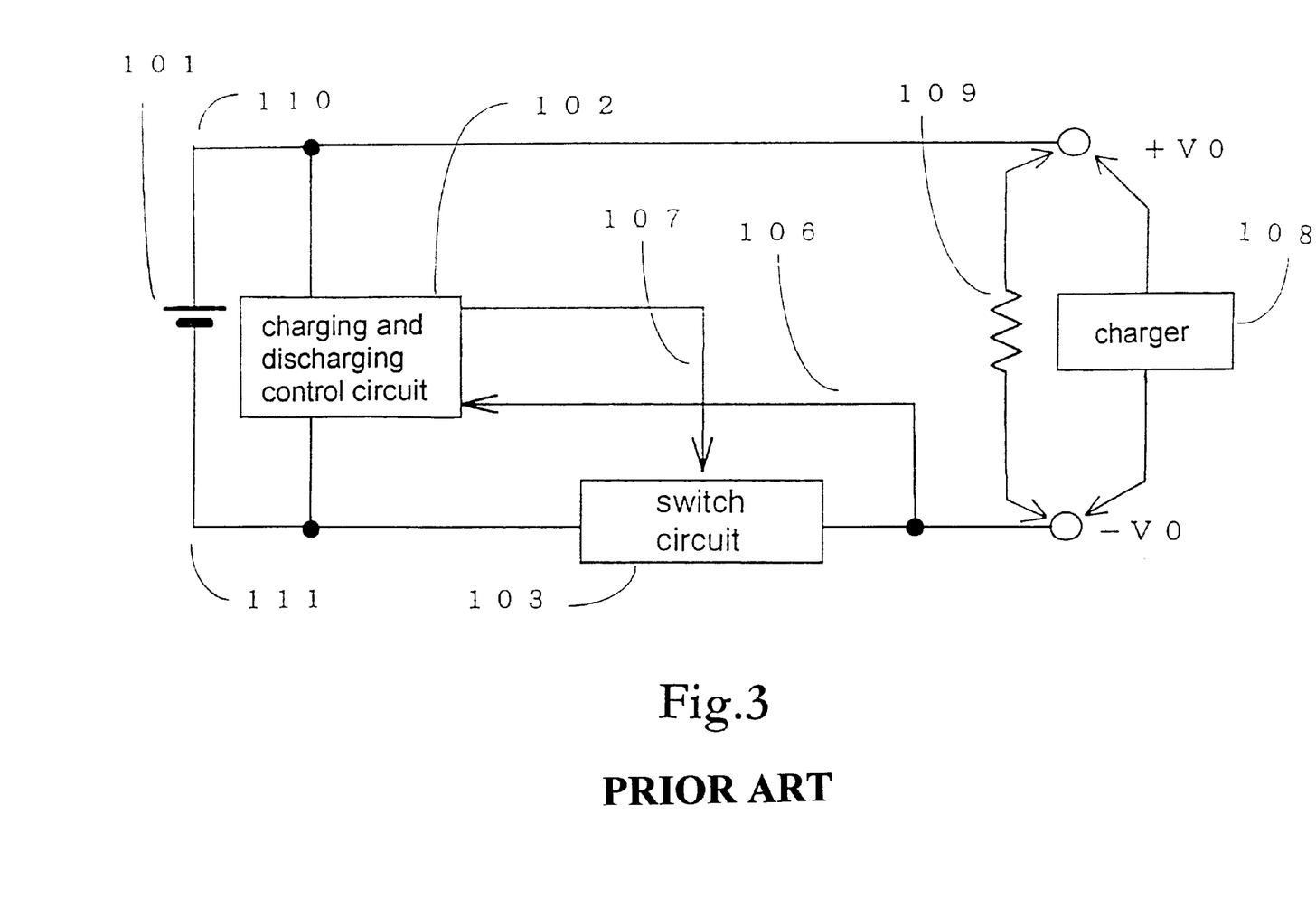
FIG. 3 is an explanatory view illustrating a block diagram of another example of a conventional charging type power supply device.

As another example of a conventional charging type power supply device comprising a secondary battery, a power supply device shown in a circuit block diagram of FIG. 3 is also known. The circuit shown in FIG. 3 differs from that shown in FIG. 2 in that the switch circuit 103 is connected in series with a negative electrode 111 of the secondary battery 101. In this way, the switch circuit 103 can function similarly in either case.

SUMMARY OF THE INVENTION

However, a charging and discharging control circuit structured in the foregoing manner has a problem in that the current consumption of the circuit itself shortens the operating time per charge of an apparatus using the secondary battery.

Figure 4:
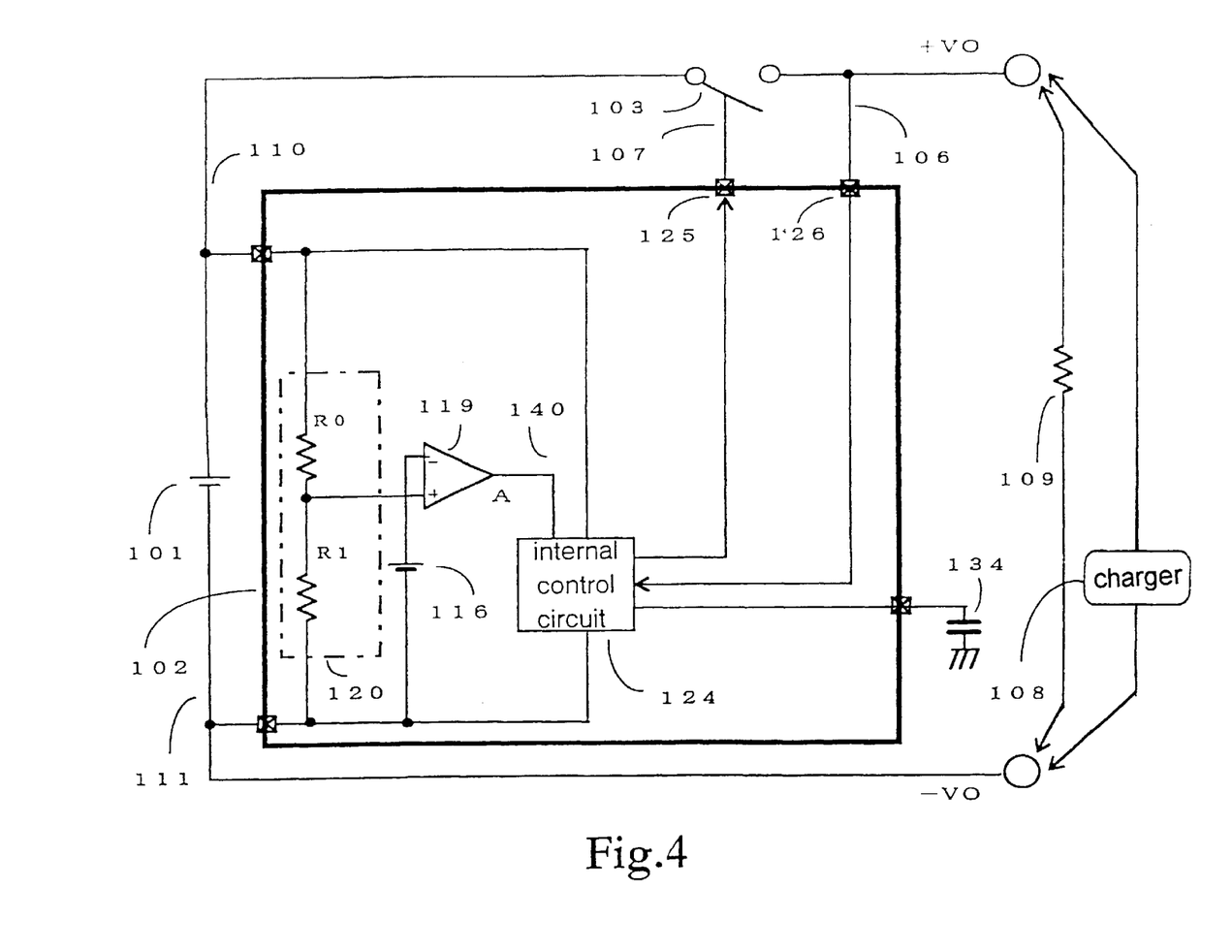
FIG. 4 is an explanatory view illustrating a circuit block diagram of the conventional charging type power supply device.

FIG. 4 shows an example of an internal circuit of the charging and discharging control circuit 102. In this circuit, only a circuit for over-charge detection is shown. The charging and discharging control circuit 102 comprises a reference voltage circuit 116 for supplying a predetermined reference voltage Vr to an input terminal of an over-charge detection comparator 119, a voltage division circuit 120 including resistors R0–R1 for dividing the terminal voltage of the secondary battery 101, and an internal control circuit 124. Actually, the switch 103 is turned off not only in the over-charge protection state but also in the over-discharge protection state and in the over-current protection state.

The internal control circuit 124 has, for example, a function of delaying a signal that is not from the detection circuit. Such a signal is an external noise, and this is done to prevent the switch circuit 103 from being turned on/off in case the battery voltage varies instantaneously. Instantaneous turning on/off is a problem because it stops power supply to the apparatus.

The internal control circuit 124 may also function as an oscillator. This is because, depending on the circuit structure, a clock is required to operate the delay circuit.

As described above, the internal control circuit 124 is formed of several elements, and since it is normally operating, current always has to be consumed.

Figure 7:
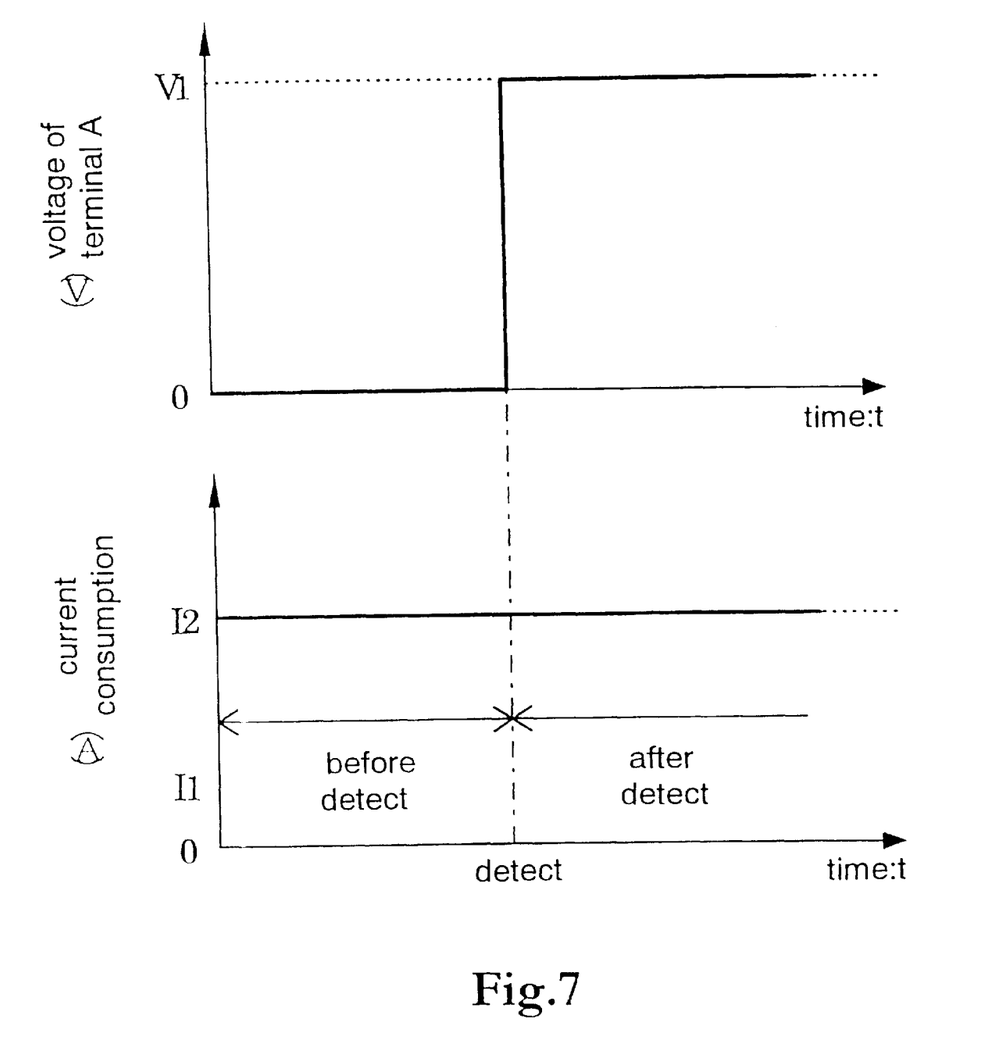
FIG. 7 is a diagram illustrating a variation in the state of the conventional charging type power supply device.

The internal control circuit 124 mentioned above has to operate only when the battery voltage is changed into a voltage to be detected. However, since the internal control circuit operates and the current is consumed even in case the state of the battery does not vary at all, there is a disadvantage in that the operating time per charge of an apparatus using the secondary battery is shortened, which is shown in FIG. 7. The horizontal axis denotes the time and the vertical axis denotes the current consumption of the charging and discharging control circuit. Independently of the state of the output of the over-charge detection comparator 119, the current consumption of the charging and discharging control circuit 124 is constant. Further, in a circuit where a clock is required, the oscillator operates even when, essentially, it is not necessary. This shortens the product life of the internal control circuit, which has an adverse effect on the long-term reliability of the charging and discharging control circuit.

An object of the present invention is, in order to solve these conventional problems, by structuring a charging and discharging control circuit such that an internal control circuit and the like operate only when the voltage of a secondary battery reaches a certain set voltage, to decrease the current consumption of the charging and discharging control circuit, to extend the operating time per charge of an apparatus using the secondary battery, and to improve the reliability of the charging and discharging control circuit. More specifically, the charging and discharging control circuit is structured such that the internal control circuit begins to operate when the certain set voltage is reached, and otherwise, the internal control circuit does not consume the current from the battery.

DESCRIPTION OF THE PREFERRED EMBODIMENTS

Figure 1:
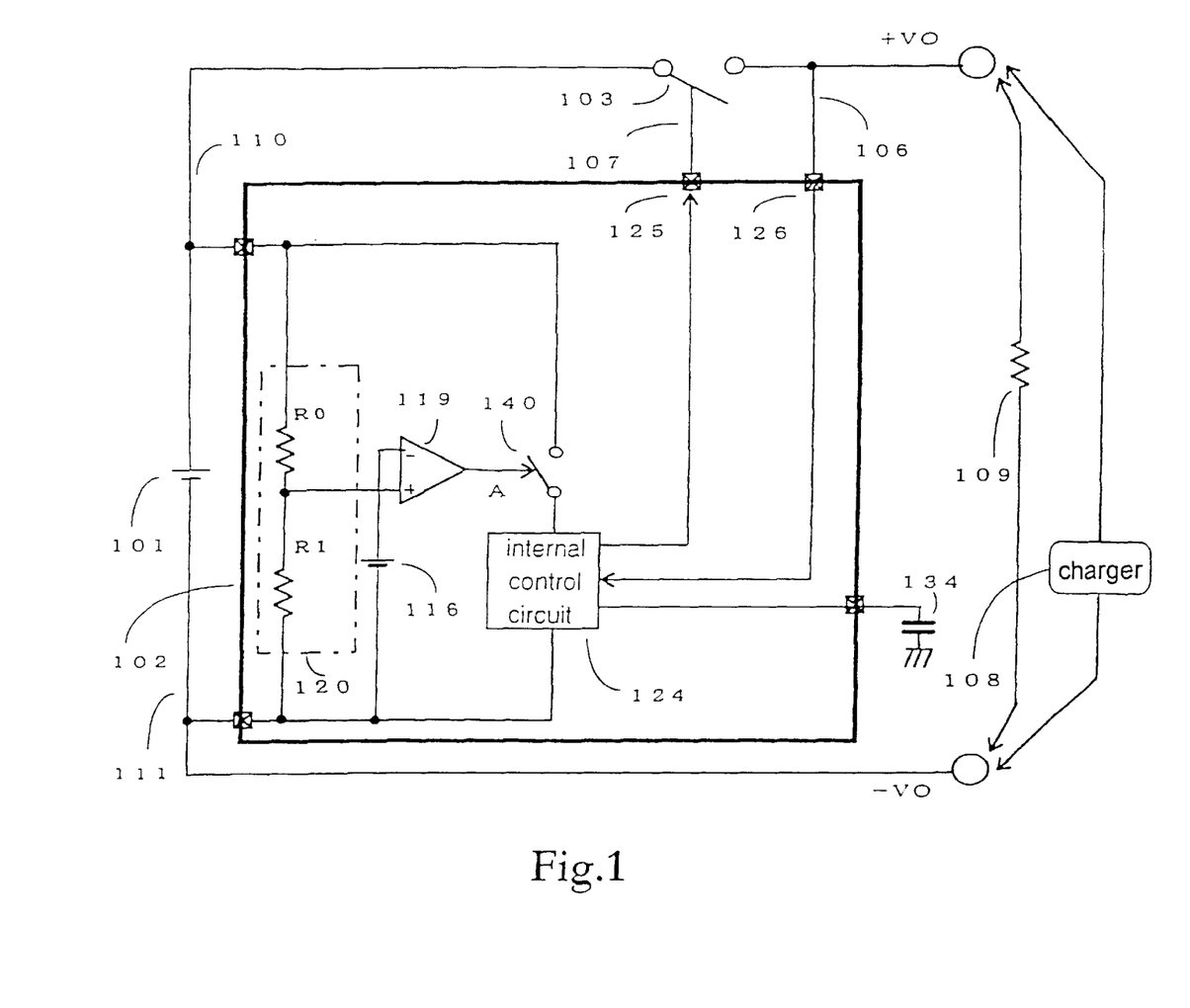
FIG. 1 is an explanatory view illustrating a circuit block diagram of a charging type power supply device according to the present invention.

FIG. 1 is a block diagram of a charging type power supply device comprising a charging and discharging control circuit of the present invention. An embodiment of the present invention is described in the following based on FIG. 1. A positive electrode 110 of a secondary battery 101 is connected to an external power supply terminal +V0 through a switch circuit 103. In the embodiment shown in FIG. 1, the switch circuit 103 is provided on the side of the secondary battery 101 for charging and discharging control. The voltage of the secondary battery 101 is detected by the charging and discharging control circuit 102. According to the result of the detection, the switch circuit 103 is controlled to be turned on/off. The charging and discharging control circuit 102 comprises a reference voltage circuit 116 for supplying a predetermined reference voltage Vr to an input terminal of an over-charge detection comparator 119, a voltage division circuit 120 including resistors R0 and R1 for dividing the terminal voltage of the secondary battery 101, a current control switch 140 and an internal control circuit 124.

The output of the internal control circuit 124 is connected to a terminal 125. The switch circuit 103 is controlled by the output of the charging and discharging control circuit 102. The switch circuit 103 is connected to the terminal 125 through a signal line 107.

An on/off control signal is sent to the switch circuit 103 from the internal control circuit 124. A charger 108 for charging the secondary battery 101 and a load 109 for which the secondary battery 101 supplies current are connected between external power supply terminals +V0 and -V0.

The over-charge detection comparator 119 has a function of comparing with the reference voltage Vr of the reference voltage circuit 116 the divided voltage output which is across the combined resistance of the resistances R0 and R1 of the voltage division circuit 120 and which represents the terminal voltage of the secondary battery 101 to detect an over-charge state.

The output of the over-charge detection comparator 119 becomes high when the level of the divided output voltage input to the + input terminal of the over-charge detection comparator 119 becomes higher than the reference voltage Vr. The internal control circuit 124 is connected to the output of the over-charge detection comparator 119. The internal control circuit 124 has on output which is varied from low to high with a predetermined time delay when the output of the over-charge detection comparator 119 varies from low to high. This is equivalent to provision of a delay circuit at the output of the over-charge detection comparator 119, and thus, the charging does not stop each time transient high voltage is applied. Only when the battery voltage is kept high for a predetermined time or longer, the switch circuit 103 is turned off to stop charging the secondary battery 101. A capacitor 134 may be connected as shown in FIG. 1 to extend the delay time. Further, the internal control circuit 124 may be provided with various functions such as that of an oscillator in addition to the delaying function.

Figure 6:
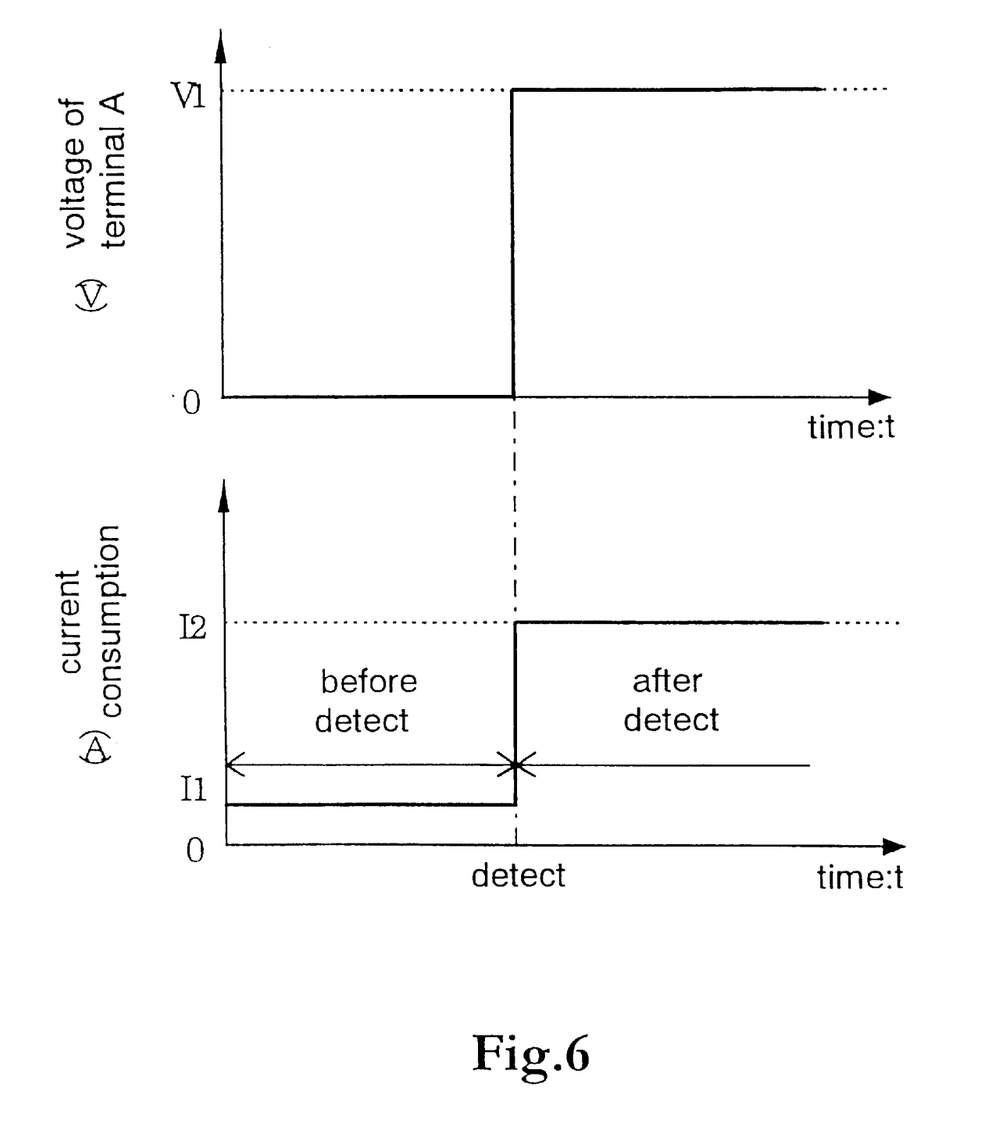
FIG. 6 is a diagram illustrating a variation in the state of the charging and discharging control circuit according to the present invention.

A current control switch circuit 140 is turned on when the output of the over-charge detection comparator 119 becomes high, in other words, when an over-charge state of the secondary battery is detected, to supply power to the internal control circuit 124. That is, the on/off of the internal control circuit 124 is controlled in response to the output of the over-charge detection comparator 119, and no current is consumed by the internal control circuit 124 during an off period. In this way, since only the over-charge detection comparator 119 operates when the terminal voltage of the secondary battery 101 is normally below an over-charge detection level, the current is made smaller, which is shown in FIG. 6. The horizontal axis denotes the time and the vertical axis denotes the current consumption of the charging and discharging control circuit. The current consumption of the charging and discharging control circuit varies around the time when the output of the over-charge detection comparator 119 varies.

Figure 5:
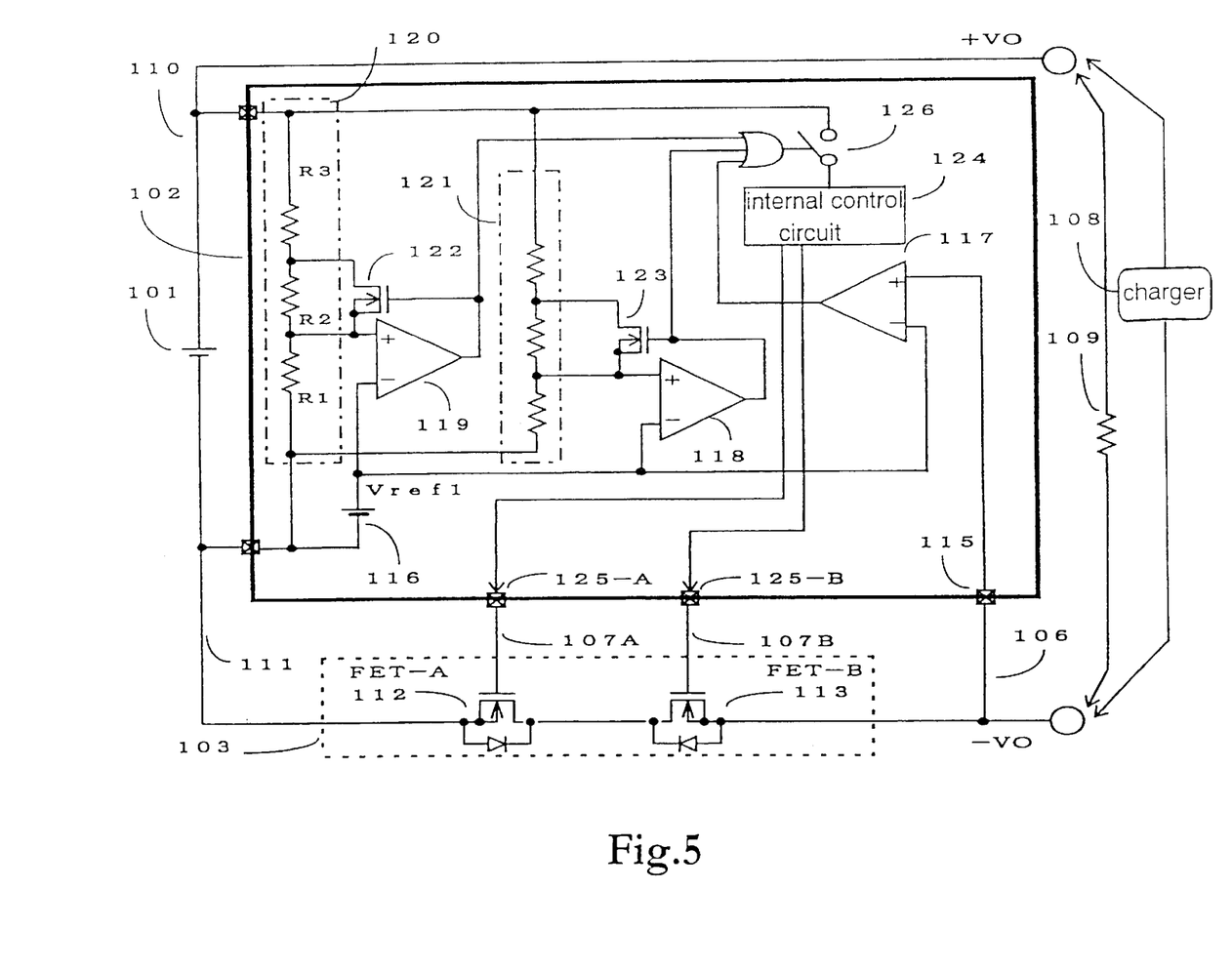
FIG. 5 is an explanatory view illustrating a circuit block diagram of another embodiment of a charging type power supply device according to the present invention.

An embodiment shown in FIG. 5 illustrates a charging type power supply device comprising a charging and discharging control circuit that has functions of detecting over-charge, over-discharge, and over-current of a battery. Two FETs (Field Effect Transistors) are used as a switch circuit 103. An FET 112 for controlling over-discharge and over-current is provided on the side of a secondary battery 101, and an FET 113 for controlling over-charge is provided on the side of an external power supply terminal -V0. In this way, two FETs may form the switch circuit 103. The voltage of the secondary battery 101 is detected by the charging and discharging control circuit 102, and, according to the result of the detection, the FETs 112 and 113 are controlled to be turned on/off. The charging and discharging control circuit 102 comprises a reference voltage circuit 116 for providing a predetermined reference voltage Vr to - (minus) input terminals of an over-charge detection comparator 119, an over-discharge detection comparator 118, and an over-current detection comparator 117, respectively, a voltage division circuit 120 including resistors R1–R3 for dividing the terminal voltage of the secondary battery 101, another voltage division circuit 121 including resistors R4–R6 for dividing the terminal voltage of the secondary battery 101, an internal control circuit 124, and a current control switch 126.

In the embodiment shown in FIG. 5, the current control switch 126 is turned on when a high level signal is output from any one of the over-charge detection comparator 119, the over-discharge detection comparator 118, and the over-current detection comparator 117, that is, when over-charge, over-discharge, or over-current of the secondary battery is detected. This brings about an effect that the current consumption is small if the comparators do not output a high level signal. In other words, it is possible to lower the current consumption even if plural detection level are required.

In the embodiment shown in FIG. 5, using a combined circuit of voltage division circuits 120 and 121 and FETs 122 and 123, the operation of the over-charge detection comparator 119, the over-discharge detection comparator 118, and the over-current detection comparator 117 is adapted to have a hysteresis effect. However, this is merely an example and it is not intended to limit thereto the structure of the present invention. It is apparent that the hysteresis operation may be implementetd by any other known circuit structure capable of providing the same effect.

In the embodiments shown in FIGS. 1 and 5, examples of structures having only one secondary battery 101 is controlled to be charged and discharged are described. However, the present invention is not limited only to the case where only one secondary battery is controlled to be charged and discharged, but is similarly applicable to a case where a plurality of serially-connected or parallel-connected secondary batteries are controlled to be charged and discharged.

In the present embodiments, the charging and discharging control circuit is formed of a C-MOS (Complementary Metal Oxide Semiconductor) circuit. However, it may be formed of any devices such as bipolar transistors, and is easily implemented.

As described above, according to the present invention, by merely adding a simple circuit, the current consumption is decreased when the voltage of a secondary battery does not reach a certain set voltage. Since the current consumption of the secondary battery is suppressed, the life of the apparatus as a whole is extended and the reliability of the charging and discharging control circuit is improved.

What is claimed is:

1. A charging and discharging control circuit comprising: voltage detecting means for detecting at least one of an over-charge state, an over-discharge state, and an over-current state of an electric power source; a control circuit for processing an output signal of the voltage detecting means and outputting a signal for controlling the charging and discharging of the electric power source; and a current control switch circuit for supplying current to the control circuit; wherein, for the purpose of decreasing current consumption of the charging and discharging control circuit, the control circuit is selectively operated by turning on/off the current control switch circuit in response to an output signal of the voltage detecting means.

2. A charging type power supply device comprising: a secondary battery; a switch circuit connected to the secondary battery; an external power supply terminal connected to the secondary battery through the switch circuit; and a charging and discharging control circuit for controlling the switch circuit; wherein the charging and discharging control circuit comprises voltage detecting means for detecting at least one of an over-charge state, an over-discharge state, and an over-current state of the secondary battery, a control circuit, and a current control switch circuit; and wherein, for the purpose of decreasing current consumption of the charging and discharging control circuit, the control circuit is selectively operated by turning on/off the current control switch circuit in response to an output signal of the voltage detecting means.

3. A charging and discharging control circuit according to claim 1; wherein the current control switch circuit is turned on to supply current to the control circuit only when one of an over-charge, an over-discharge and an over-current state of the electric power source is detected by the voltage detecting means.

4. A charging and discharging control circuit according to claim 1; wherein the electric power source comprises a secondary battery.

5. A charging and discharging control circuit according to claim 4; wherein the voltage detecting means comprises a comparator for comparing a reference voltage with a voltage representing an output voltage of the secondary battery.

6. A charging and discharging control circuit according to claim 5; further comprising a voltage dividing circuit for dividing an output voltage of the secondary battery and producing a divided output voltage, the divided output voltage being supplied to the comparator as the voltage representing an output voltage of the secondary battery.

7. A charging and discharging control circuit according to claim 6; wherein the voltage dividing circuit comprises one or more resistors for dividing the output voltage of the secondary battery, and wherein the reference voltage and the resistance value of the resistors are selected so that an output of the comparator switches when the secondary battery enters an over-charge state.

8. A charging and discharging control circuit according to claim 6; wherein the voltage dividing circuit comprises one or more resistors for dividing the output voltage of the secondary battery, and wherein the reference voltage and the resistance value of the resistors are selected so that an output of the comparator switches when the secondary battery enters an over-discharge state.

9. A charging and discharging control circuit according to claim 5; wherein the voltage detecting means further comprises a second comparator for comparing a second reference voltage with a voltage representing a current output of the secondary battery.

10. A charging and discharging control circuit according to claim 9; further comprising a resistor connected to an output of the secondary battery, wherein the voltage across the resistor is the voltage representing a current output of the secondary battery.

11. A charging and discharging control circuit according to claim 10; wherein the resistance value of the resistor and the second reference voltage are selected so that an output of the second comparator switches when the secondary battery enters an over-current state.

12. A charging and discharging control circuit according to claim 1; wherein the voltage detecting means comprises a comparator for comparing a reference voltage with a voltage representing an output voltage of the electric power source.

13. A charging and discharging control circuit according to claim 12; wherein the reference voltage is an over-charge voltage of the electric power source.

14. A charging and discharging control circuit according to claim 12; wherein the reference voltage is an over-discharge voltage of the electric power source.

15. A charging and discharging control circuit according to claim 12; wherein the reference voltage is a voltage representing an over-current state of the electric power source.

16. A charging and discharging control circuit according to claim 1; wherein the control circuit comprises a delay circuit for delaying an output signal of the voltage detecting means so that instantaneous and transient variations in output voltage of the electric power source do not cause charging or discharging of the electric power source to be stopped.

17. A charging and discharging control circuit according to claim 1; wherein the control circuit comprises one of a pull-up transistor and a pull-down transistor for pulling up or pulling down an output signal of the voltage detecting means to provide a hysteresis effect.

18. A charging type power supply device according to claim 2; wherein the current control switch circuit is turned on to supply current to the control circuit only when one of an over-charge, an over-discharge and an over-current state of the electric power source is detected by the voltage detecting means.

19. A charging type power supply device according to claim 2; wherein the electric power source comprises a secondary battery.

20. A charging type power supply device according to claim 19; wherein the voltage detecting means comprises a comparator for comparing a reference voltage with a voltage representing an output voltage of the secondary battery.

21. A charging type power supply device according to claim 20; further comprising a voltage dividing circuit for dividing an output voltage of the secondary battery and producing a divided output voltage, the divided output voltage being supplied to the comparator as the voltage representing an output voltage of the secondary battery.

22. A charging type power supply device according to claim 21; wherein the voltage dividing circuit comprises one or more resistors for dividing the output voltage of the secondary battery, and wherein the reference voltage and the resistance value of the resistors are selected so that an output of the comparator switches when the secondary battery enters an over-charge state.

23. A charging type power supply device according to claim 21; wherein the voltage dividing circuit comprises one or more resistors for dividing the output voltage of the secondary battery, and wherein the reference voltage and the resistance value of the resistors are selected so that an output of the comparator switches when the secondary battery enters an over-discharge state.

24. A charging type power supply device according to claim 20; wherein the voltage detecting means further comprises a second comparator for comparing a second reference voltage with a voltage representing a current output of the secondary battery.

25. A charging type power supply device according to claim 24; further comprising a resistor connected to an output of the secondary battery, wherein the voltage across the resistor is the voltage representing a current output of the secondary battery.

26. A charging type power supply device according to claim 25; wherein the resistance value of the resistor and the second reference voltage are selected so that an output of the second comparator switches when the secondary battery enters an over-current state.

27. A charging type power supply device according to claim 2; wherein the voltage detecting means comprises a comparator for comparing a reference voltage with a voltage representing an output voltage of the electric power source.

28. A charging type power supply device according to claim 27; wherein the reference voltage is an over-charge voltage of the electric power source.

29. A charging type power supply device according to claim 27; wherein the reference voltage is an over-discharge voltage of the electric power source.

30. A charging type power supply device according to claim 27 wherein the reference voltage is a voltage representing an over-current state of the electric power source.

31. A type power supply device according to claim 2; wherein the control circuit comprises a delay circuit for delaying an output signal of the voltage detecting means so that instantaneous and transient variations in output voltage of the electric power source do not cause charging or discharging of the electric power source to be stopped.

32. A charging type power supply device according to claim 2; wherein the control circuit comprises one of a pull-up transistor and a pull-down transistor for pulling up or pulling down an output signal of the voltage detecting means to provide a hysteresis effect.

33. A charge/discharge control circuit comprising:

a detecting circuit for detecting at least one of an over-charge state, an over-discharge state and an over-current state of an electric power source;

a control circuit for receiving an output signal of the detecting circuit and for outputting a signal for controlling the charging and discharging of the electric power source; and an activating circuit connected to the control circuit for selectively activating the control circuit according to an output signal of the detecting circuit so as to limit the power consumption of the charge/discharge control circuit by operating the control circuit only when one of an over-charge state, an over-discharge state and an over-current state of the electric power source is detected.

34. A charge/discharge control circuit according to claim 33; wherein the detecting circuit comprises a voltage dividing circuit for dividing an output voltage of the electric power source and producing a plurality of divided output voltages, an over-charge voltage detection circuit, and an over-discharge voltage detection circuit for detecting a level of selected ones of the divided output voltages of the voltage dividing circuit, and wherein the control circuit is receptive of output signals of the over-charge voltage detection circuit and the over-discharge detection circuit and outputs a signal for controlling the charging and discharging of the electric power source based on output signals thereof.

* * * * *